United States Patent [19]

Taniyama et al.

[11] 4,278,783
[45] Jul. 14, 1981

[54] METHOD OF CURING AN ORGANOALKOXYSILANE COMPOUND

[75] Inventors: Susumu Taniyama, Toyonaka; Goro Shimaoka, Sakai; Shoichi Inoue, Itami, all of Japan

[73] Assignee: Mitsubishi Gas Chemical Company Inc., Tokyo, Japan

[21] Appl. No.: 72,221

[22] Filed: Sep. 4, 1979

[30] Foreign Application Priority Data

Sep. 5, 1978 [JP] Japan .................................. 53/108756

[51] Int. Cl.$^3$ ....................... C08G 77/04; C08G 77/08
[52] U.S. Cl. ...................................... 528/23; 260/185; 525/20; 525/29; 525/100; 525/101; 525/443; 525/446; 528/38; 106/287.11; 106/287.12; 106/287.13
[58] Field of Search ................... 528/23, 38; 260/185; 525/443, 446, 20, 29, 100, 101; 106/287.11, 287.12, 287.13

[56] References Cited

U.S. PATENT DOCUMENTS

| | | | |
|---|---|---|---|
| 2,842,515 | 7/1958 | Agens | 528/23 |
| 3,414,463 | 12/1968 | Jasinski | 528/23 |
| 3,425,974 | 2/1969 | Semroc | 528/30 |
| 3,528,998 | 9/1970 | Tesoro | 525/29 |
| 3,821,003 | 6/1974 | Dittrich et al. | 106/1.12 |
| 3,961,977 | 6/1976 | Koda et al. | 106/287.11 |
| 4,049,634 | 9/1977 | Ko et al. | 525/100 |
| 4,147,855 | 4/1979 | Schiller et al. | 528/23 |
| 4,167,537 | 9/1979 | Taniyama et al. | 525/446 |

FOREIGN PATENT DOCUMENTS 511359  3/1955  Canada ........................................ 525/20

OTHER PUBLICATIONS

Derwent Abs. 81890 R-A (JA-7034707) Silicone Cont. Thermosetting Composition, Nov. 7, 1970.

*Primary Examiner*—Joseph L. Schofer
*Assistant Examiner*—Herbert J. Lilling
*Attorney, Agent, or Firm*—Browdy & Neimark

[57] ABSTRACT

A method is herein disclosed for curing an organoalkoxysilane compound characterized by using as a catalyst at least one compound selected from the group consisting of a phosphite of the formula:

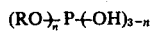

and a phosphate of the formula:

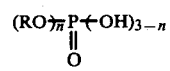

(wherein R is an alkyl group having 1 to 4 carbon atoms and/or an aromatic group; n is an integer of 1 or 2).

6 Claims, No Drawings

METHOD OF CURING AN ORGANOALKOXYSILANE COMPOUND

BACKGROUND OF THE INVENTION

1. Field of the Invention

This invention relates to a method for curing an organoalkoxysilane compound, and more particularly, to a method for converting an organoalkoxysilane compound to organopolysiloxane characterized by using a selected phosphite as a catalyst.

2. Description of the Prior Art

An organoalkoxysilane compound which, upon heating, forms a siloxane bond to provide a cured product having a network structure finds utility in many applications such as an electrical insulating material, electrical insulating varnish and mar resistant paint. The compound is useful as a base material that has desired properties such as high heat resistance and water resistance as well as good weather-ability and electrical insulation. In recent years, the organoalkoxysilane compound if drawing researchers' attention as a material that forms a transparent mar resistant coating on a transparent plastic shaped article, for instance, a shaped article of polycarbonate, polymethyl methacrylate, cellulose butyrate, polyvinyl chloride or polystyrene. Because of their transparency and lightweightness, these plastic shaped articles are expected to replace glass in many applications, but the fact is that, to date, their use has been limited because of their vulnerability to abrasion and loss of transparency.

Several methods have been proposed to eliminate such defect of the transparent plastic shaped article by coating its surface with a transparent paint to provide a protective film. Silicone paints are most popular as the paint that forms a transparent protective coating. One example of such methods is disclosed in U.S. Pat. No. 3961977 wherein a plastic shaped article is coated with a paint comprising a partial hydrolyzate of epoxyalkylalkoxysilane and aminoalkylalkoxysilane plus an organic solvent. In U.S. Pat. No. 4,167,537 a paint is proposed comprising said reaction product of epoxyalkylalkoxysilane and aminoalkylalkoxysilane plus a melamine/alkyd resin, and optionally a derivative of acrylic acid. However, these paints exhibit high mar resistance only after they are cured under very severe conditions, such as at 130° C. for a period of 4 hours. Such severe conditions of thermal curing not only limit the kind of the substrate shaped article but sometimes they also cause the discoloration (yellowing) problem due to thermal deterioration of the coating.

As a further disadvantage, an organoalkoxysilane compound in storage gradually absorbs atmospheric moisture and this deactivates (i.e. renders inactive) the active group (generally an alkoxysilane group) contributory to the curing reaction, and this may result in insufficient heat curing. If the organoalkoxysilane compound is used as a paint, such disadvantage is the cause of its characteristic deterioration, namely, considerable decrease in the mar resistance of the final coating it forms. To inhibit such deterioration, the prior art technique has incorporated in the compound a catalyst consisting of a mineral acid such as phosphoric acid or sulfuric acid or a hydroxide of alkali metal. However, these catalysts exhibit their effect even during storage of the paint and as a result, the storage stability of the paint is decreased to such an extent that it is no longer commercially acceptable.

SUMMARY OF THE INVENTION

In consequence of various studies in search for a method of solving the above mentioned problems with the use of an organoalkoxysilane compound, the inventors of this invention have found that a selected type of organic phosphite has the effect of facilitating thermal curing of the compound by maintaining its storage stability and functioning as a catalyst only when it is thermally cured.

Therefore, one object of this invention is to provide a novel method for curing an organoalkoxysilane compound.

Another object of this invention is to provide a specific phosphite available for curing an organoalkoxysilane compound.

A further object of this invention is to provide a novel method for curing an organoalkoxysilane compound characterized by using a specific phosphite.

Other objects and advantages of this invention will be apparent by reading the following detailed description of the invention.

DETAILED DESCRIPTION OF THE INVENTION

In accordance with this invention, there is provided a method of heat-curing of an organoalkoxysilane compound characterized by using as a catalyst a phosphite of the formula (I):

$$(RO)_nP(OH)_{3-n} \qquad (I)$$

(wherein R is an alkyl group having 1 to 4 carbon atoms and/or an aromatic group; n is an integer of 1 or 2).

The term "organoalkoxysilane" as used herein is the generic name for the compounds of the formula $R_nSi(OR')_{4-n}$ (wherein R is an alkyl group or aryl group, optionally being substituted by a functional group; R' is an alkyl group; n is an integer of 1 to 3). Therefore, it should be understood that the organoalkoxysilane compound includes organoalkoxysilane and derivatives thereof, a composition mainly consisting of organoalkoxysilane, a product prepared from organoalkoxysilane, and so forth.

As stated in the foregoing, the above defined catalyst to be used in the method of this invention is inactive at low temperature, and therefore, the storage stability of the organoalkoxysilane compound is not impaired, and upon heating, it becomes active enough to accelerate the curing process. The catalyst has another advantage in practice in that it has the effect of allowing the compound to be cured at lower temperatures, that is, under less severe thermal conditions.

Illustrative phosphites of the formula (I) that can be employed in this invention are set forth below:

Monomethyl phosphite, monoethyl phosphite, monopropyl phosphite, monobutyl phosphite, dimethyl phosphite, diethyl phosphite, dipropyl phosphite, dibutyl phosphite, diphenyl phosphite, methyl phenyl phosphite, and ethyl phenyl phosphite.

These compounds may be used singly or as a mixture. They are used in an amount of at least one percent by weight based on the organoalkoxysilane compound. A lesser amount will not be sufficient to achieve the intended catalytic activity fully. While there is no upper limit on the content of the catalyst, using a more than necessary amount of the catalyst may prove disadvantageous; for example, when an excessive amount of the catalyst is incorporated in the organoalkoxysilane compound used as a paint, the coating formed may turn yellow, or its performance, particularly resistance to boiling water, may be reduced. It is generally preferred that the catalyst is used in an amount of at least 10 wt% based on the organoalkoxysilane compound. The catalyst may be more preferably used in an amount of 2 to 5%. The catalyst of this invention is preferably incorporated in the organoalkoxysilane compound by dissolving a desired amount of it in a small volume of a suitable solvent. Examples of the suitable solvent are those which dissolve the catalyst and are miscible with (or can dissolve) the silane compound; specific examples are ethylene glycol monoethyl ether, ethylene glycol monobutyl ether, n-butyl alcohol, iso-butyl alcohol, and iso-propyl alcohol.

The method of this invention is performed at a curing temperature of at least 50° C. which is necessary for activation of the catalyst. A temperature of 100° C. or higher is generally preferred.

The organoalkoxysilane compound to which the method of this invention is applicable includes one or more of organoalkoxysilanes exemplified by (a) an alkyl alkoxysilane typified by dimethyl dimethoxysilane, trimethyl methoxysilane or tetramethoxysilane and (b) an aryl alkoxysilane typified by diphenyl dimethoxysilane or triphenyl methoxysilane, or carbon-functional silanes typified by aminoalkyl alkoxysilane, epoxyalkyl alkoxysilane, acryloxyalkyl alkoxysilane and vinyl alkyl alkoxysilane; reaction products of these organoalkoxysilanes and or carbon-functional silanes; and compositions which mainly consist of these organoalkoxysilanes and/or carbon-functional silanes plus a modifier such as an acrylic ester such as alkyl methacrylate and glycidyl methacrylate or an organic high molecular compound having a functional group like a vinyl group, carboxyl group, amino group, oxirane ring, or a hydroxyl group.

Preferable examples of the organic high molecular compound as the modifier is an oil-free alkyd resin. The partial hydrolyzates of said organoalkoxysilanes and/or carbon-functional silanes are also included within the organoalkoxysilane compound according to this invention.

The organoalkoxysilane compound is presumably converted to silanol before it forms a siloxane bond and turns to a cured product, and the presence of moisture is preferred for such reaction system. Take the example of a silicone paint; it absorbs atmospheric moisture which has a favorable effect on the subsequent curing process, thus achieving the object of this invention. The paint is cured in a more advantageous manner if it contains an additional amount of water which will not adversely affect the storage stability of the paint. Such favorable effect of moisture is not limited to the silicone paint alone and a similar effect is obtained in other applications that use the organoalkoxysilane compound.

The method of this invention will hereunder be described in greater detail by reference to the following Examples and Comparative Examples which are given here for illustrative purposes only and are by no means intended to limit the scope of applicability of the method. Unless otherwise specified, all parts and percents in the Examples and Comparative Examples are by weight.

EXAMPLES 1 TO 6 AND COMPARATIVE EXAMPLES 1 AND 2

A mixture of 35% of a reaction product of 2.5 parts of N-(trimethoxysilylpropyl)ehtylenediamine, 7.0 parts of N-(dimethoxymethylsilylpropyl)ethylenediamine and 20.6 parts of α-glycidoxypropyl trimethoxysilane, 10% of an oil-free alkyd resin (available from Dainippon Ink Chemical Industries under the trade name "Beckolite M 6401-50"), 10% of n-butyl methacrylate and 45% of ethylene glycol monoethyl ether (solvent) was used as a paint composition (to be hereunder referred to as "Paint A"). A shaped article of polycarbonate resin, 3 mm thick, 20 mm wide and 50 mm long, was used as the substrate to be coated with Paint A. Various concentrations of diethyl phosphite were incorporated in Paint A. The substrate was immersed in Paint A with which it was coated to a final thickness of about 10 microns, and thereafter the substrate was heat-cured at various temperatures and the mar resistance and yellowing of the protective coating was checked. Table 1 sets forth the results of the checking.

TABLE 1

| Run No. | Catalyst[1] content (%) | Mar resistance after 4-hours heating[2] | | | | | | | Yellowing[3] |
|---|---|---|---|---|---|---|---|---|---|
| | | 90° C. | 100° C. | 110° C. | 115° C. | 120° C. | 125° C. | 130° C. | |
| Com. Ex. 1 | 0 | C | C | C | C | C | B | A | No yellowing |
| 2 | 0.5 | C | C | C | C | B-C | B | A | " |
| Ex. 1 | 1.0 | C | C | B | B | A-B | A | A | " |
| 2 | 2.0 | C | C | B | A | A | A-A' | A' | " |
| 3 | 3.0 | C | B | A | A-A' | A-A' | A' | A' | " |
| 4 | 5.0 | C | B | A | A-A' | A' | A' | A' | " |
| 5 | 7.0 | C | B | A | A-A' | A' | A' | A' | Slightly yellowed |
| 6 | 10.0 | C | B | A | A-A' | A' | A' | A' | " |

Notes:
[1]Catalyst content is expressed in percent based on the weight of the organoalkoxysilane compound contained in Paint A.
[2]Mar resistance that varied with the heating (curing) temperature. A #0000 steel wool was used to rub the protective coating lightly back and forth. With one cycle consisting of rubbing back and forth, 15 cycles of rubbing were performed. The symbols A', A, B and C in Table 1 are four degrees used for indicating the severity of any resulting scratch in the coating.
A': No scratch
A: Few scratches
B: Countable scratches causing no loss of luster
C: Many scratches resulting in loss of luster
[3]The samples were cured at 130° C. for a period of 4 hours and checked with the naked eye for any yellowing the occurred.

EXAMPLE 7 AND COMPARATIVE EXAMPLE 3

Two different types of paints were prepared. One of them was Paint A used in Comparative Example 1. The second was Paint B consisting of Paint A and 2% of diethyl phosphite based on the solid content of the paint. These paints were placed in two 100 cc conical flasks, respectively, and let stand in an open system at 25° C. for the periods of time indicated in Table 2 below. The paints were applied to the substrate, cured at 130° C. for a period of 4 hours, and checked for the mar resistance of the protective coating in the same manner as Examples 1 to 6. The results are indicated in Table 2 below.

TABLE 2

| Run No. | Paint | Days stood | | | | | | | |
|---|---|---|---|---|---|---|---|---|---|
| | | 1 | 2 | 3 | 4 | 5 | 6 | 7 | 8 |
| Com. Ex. 3 | A | A | A | A | B | B | B | C | C |
| Ex. 7 | B | A' | A' | A' | A' | A' | A'-A | A'-A | A'-A |

Table 2 shows that although the coating of Paint A containing no catalyst has its mar resistance gradually decreased on the 4th day of standing afterward, Paint B was substantially free from such defects even after 8-day standing. The viscosities of the two paints or the 8th day of standing were measured with a Ford cup; the results were 11 to 12 seconds which did not substantially differ from the initial value of 10 seconds.

EXAMPLE 8

A mixture of 4.2 parts of N-β-aminoethyl aminomethyl trimethoxysilane, 3.9 parts of N-(dimethoxymethylsilylpropyl) ethylenediamine and 8.9 parts of γ-glycidoxypropyl trimethoxysilane was dispensed in a beaker, stirred at 50° C. for a period of 90 minutes and thereafter cooled to 25° C. After addition of 90 parts of dehydrated isobutanol and one part of water, the mixture was stirred for an additional 90 minutes for further reaction, and the resulting reaction product was used as a paint. The paint was blended with 5 wt% of dibutyl phosphite based on the solid content of the paint. A shaped substrate of polycarbonate was immersed in the pain and cured at 115° C. for a period of 4 hours. The resulting coating was about 5 microns thick and evaluated A in the mar resistance test conducted in the same manner as Examples 1 to 6. Controls using catalyst-free paints and heat-cured under the same conditions as used above were evaluated B or C.

What is claimed is:

1. A method of curing an organoalkoxysilane compound characterized by using as a catalyst a phosphite of the formula:

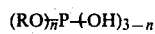
$(RO)_{\overline{n}}P{-}(OH)_{3-n}$ wherein R is an alkyl group having 1 to 4 carbon atoms and/or an aromatic group; and n is an integer of 1 or 2.

2. A method according to claim 1 wherein the catalyst is used in an amount of from 1 to 10% based on the weight of the organoalkoxysilane compound.

3. A method according to claim 1 wherein the organoalkoxysilane compound is selected from the group consisting of organoalkoxysilanes, carbon-functional silanes, reaction products of the organoalkoxysilanes and/or the carbon-functional silanes and compositions which mainly consist of the organoalkoxysilanes and/or the carbon-functional silanes.

4. A method according to claim 3 wherein said carbon-functional silanes are aminoalkyl alkoxysilane and epoxyalkyl alkoxysilane.

5. A method according to claim 1 wherein the organoalkoxysilane compound is cured at a temperature of at least 50° C., preferably at least 100° C.

6. A method according to claim 1 wherein the phosphite is diethyl phosphite.

* * * * *